Oct. 30, 1923. 1,472,589
L. M. ELLIS
APPARATUS FOR GUAGING ROLLERS AND OTHER ARTICLES
Filed Dec. 15, 1922 6 Sheets-Sheet 2

INVENTOR
LLEWELLYN M. ELLIS
BY Richards Geier
ATTORNEYS

Oct. 30, 1923.

L. M. ELLIS

1,472,589

APPARATUS FOR GUAGING ROLLERS AND OTHER ARTICLES

Filed Dec. 15, 1922  6 Sheets-Sheet 5

INVENTOR
LLEWELLYN M. ELLIS
BY Richards & Geier
ATTORNEYS

Patented Oct. 30, 1923.

1,472,589

UNITED STATES PATENT OFFICE.

LLEWELLYN MILFORD ELLIS, OF WARD END, BIRMINGHAM, ENGLAND, ASSIGNOR TO THE TIMKEN ROLLER BEARING COMPANY, OF CANTON, OHIO, A CORPORATION OF OHIO.

APPARATUS FOR GAUGING ROLLERS AND OTHER ARTICLES.

Application filed December 15, 1922. Serial No. 607,256.

*To all whom it may concern:*

Be it known that I, LLEWELLYN MILFORD ELLIS, subject of the King of Great Britain, residing at Ward End Works, Ward End, Birmingham, England, have invented certain new and useful Improvements in Apparatus for Gauging Rollers and Other Articles, of which the following is a specification.

This invention relates to apparatus for grading or gauging rollers or balls for bearings, and for grading or gauging other articles, the improved apparatus being, however, principally intended for automatically grading taper rollers according to their diameters in relation to the distance from their large ends.

According to the invention the roller, or other article to be graded, is carried by a suitable holder and is adapted to be engaged by the edge of a gage-plate, a relative reciprocating or sliding movement being imparted either to the gage-plate or to the holder for this purpose, so that the roller or other article is wedged against the holder and is ejected by suitable means into a chute or receptacle, or into one of a series of chutes or receptacles.

Preferably the edge of the gage-plate is inclined with respect to the holder, so that on a relative sliding or reciprocating movement taking place between the gage-plate and the holder the distance between the roller or other article and the edge of the gage-plate gradually decreases until the roller or other article is engaged by the latter, the said gage-plate and the holder, together with the roller or other article, then moving as one unit until the roller or other article is ejected, the chute or receptacle into which the roller or other article is delivered depending on its diameter, all rollers of the same diameter being delivered into the same chute or receptacle. Should a roller be larger in diameter than any of the grades required it may be arranged so that it is wedged against its holder by a special projection, so that it is carried over a special chute into which it is delivered, the roller being then discarded; a projection may also be provided for knocking the roller from its holder should it be smaller than any of the grades required.

Referring to Figures 1 to 8, the improved grading or gauging machine comprises a sliding or reciprocating member 1 of a rectangular formation mounted upon guides upon a fixed bed or support 2 and moving on rollers 3, a reciprocating movement being imparted to the said member by a crank 4, slotted lever 5, and connecting rod 72. The upper face of this reciprocating member 1 is formed with a longitudinal trough or channel 6 having parallel sides, the sides of the channel being also parallel to the direction of movement of the reciprocating member 1. Fixed to the upper face of the latter upon one side of the channel is a longitudinally disposed gage-plate 7. This gage-plate is arranged so that its one edge projects over the edge of the channel 6 and is inclined with respect to the sides of the latter, the edge of the gage-plate being capable of being adjusted to any suitable angle with respect to the said sides, according to the diameters of the rollers to be graded. For this purpose the gage-plate 7 is secured to the reciprocating member 1 by bolts 8 passing through slots 9 in the said plate, the latter being adapted to be adjusted to the required inclination by additional bolts or screw-pins 10 whose extremities bear upon its rear edge, the said bolts 10, passing through tapped holes in a flange 11 along the outer edge of the reciprocating member 1, one bolt being arranged to engage with each end of the gage-plate 7. The latter is rigidly clamped in position by the bolts 8 after it has been adjusted. When the nuts on the bolts 8 have been loosened and the adjusting bolts or screw-pins 10 disengaged from the edge of the gage-plate the latter is arranged to be drawn automatically outwards by spring influenced hook-bolts 12 passing through holes in the flange 11 of the reciprocating member and whose hooked ends engage with grooves 13 in the underside of the gage-plate 7. The latter is formed upon its one edge, which projects over the channel 6 in the reciprocating member 1, with a number of projections 14 spaced preferably at equal distances apart, the forward edges of the whole of the projections 14 being in line, and each equally inclined with respect to the edge of the channel 6 in the reciprocating member 1, each successive projection extending further over the said edge. Formed at the extreme end of the gage-plate 7 is a smaller projection 15 which serves to remove any rollers which are of a diameter larger than that of any of the grades required, these rollers being discarded. Formed in the reciprocating member 1 immediately below each projecting portion 14 of the gage-plate 7 is a vertical hole or passage 16 for the ejection of the rollers after being graded, a vertical hole or passage 17 being also formed beneath the projection 15 for the reception of the rollers which are to be discarded owing to being of too large a diameter. For ejecting rollers which are of too small a diameter for the purpose required a separate ejector-plate 18 is provided, secured to the reciprocating member 1 by a bolt 19, the said plate having a projection 20 which engages against and ejects rollers which are too small to be engaged by the projections upon the gage-plate. Arranged at one end of the channel 6 in the reciprocating member and fitting against the gage-plate side of the latter is a locating block 21 upon which the rollers to be graded are dropped. This locating block 21 fits partly beneath the edge of the gage-plate 7, whilst it is formed in its top face with a longitudinal open-ended groove 22 within which the larger end of the roller fits. The said locating block 21 is always held stationary with respect to the reciprocating member 1, being for this purpose rigidly secured upon one end of a fixed rod 23 secured at its other end to a vertical arm 24 carried by the bed 2 of the machine, the rod 23 lying longitudinally within the channel portion 6 but separated from the walls and bottom of the latter. Fitted within the channel 6 alongside the said locating member 21 is a supporting block 25 to the upper face of which is secured a roller holder 26 by means of bolts 27. This roller holder 26 consists of a rectangular block having a transverse V-gap 28 cut in its one edge, the said V-gap being directly opposite the edge of the gage-plate 7 and serving to hold the roller in position. Owing to the taper formation of the rollers the edge of the gage-plate 7 and the edge of the V-gap in the roller holder 26 is slightly undercut or inclined to conform with the inclination of the sides of the roller so that the latter is held in a vertical position. The supporting block 25 and the roller holder 26 are normally both held stationary by means of a spring clip comprising a pair of laterally separated spring blades 29 which engage with opposite sides of a vertical pin 30 secured to one end of the supporting block 25, the said spring blades being secured to the opposite side of a plate 31 fixed by a bolt 32 to an upper transverse frame member 56 of the machine. Normally, therefore, the reciprocating member 1 moves relatively to the roller-holder 26 and the supporting block 25 to which it is attached, which is held by the spring, and as the reciprocating member moves outwards past the roller holder 26 the inclined edges of the projecting portions 14 of the gage-plate 7 approach nearer to the V-gap 28 in the latter, the distance between the edge of each successive projecting portion 14 and the V-gap 28 in the roller holder gradually decreasing.

The roller 34 which is to be graded is dropped down by an automatic feed (hereafter described) when the reciprocating member is at the beginning of its outward stroke, that is prior to the projecting portions on the gage-plate 7 moving past the roller holder 26, the said roller being arranged so that its larger end rests in the groove 22 in the locating block 21 and so that its one side fits within the V-gap in the roller holder 26, the roller 34 being supported with its axis in a vertical position. The locating block 21 serves to position the roller and ensures the gage-plate 7 engaging the rollers at a constant distance from their large ends. On the reciprocating member 1 moving outwards the projecting portions of the gage-plate are moved past the roller holder 26 and the roller 34, the distance between the latter and each successive projection 14 decreasing owing to the inclination of the edge of the gage-plate 7. The reciprocating member 1 moves outwards in this manner until the inclined edge of one of the projections 14 on the gage-plate engages with the roller 34, the projection in question depending on the diameter of the latter. On the reciprocating member 1 moving further the roller 34 is wedged between the said projection and the roller holder 26 owing to the inclined edge of the projection, and the reciprocating member 1, together with the roller 34 and roller holder 26 move as one unit, the pin 30 upon the roller holder 26 being disengaged from the spring arms 29 which normally hold the roller holder 26 stationary, whilst the roller leaves the locating block 21, which is held stationary by the rod 23. When the reciprocating member 1 has reached the end of its stroke the holes or passages 16 in the reciprocating member opposite each projecting portion 14 of the gage-plate 7, are arranged to come immediately above or into register with a series of chutes 35 carried by the bed 2 of the machine. At this instant the roller 34 is ejected (by means hereafter described) from between the roller holder 26 and the projection 14 on the gage-plate by which it was engaged so that it drops through the passage 16 immediately beneath the said projection 14 into the respective chute 35, by which it is delivered into a receptacle 36, a separate receptacle 36 being arranged beneath each chute. The chute into which the roller is delivered depends on which projection the roller is engaged by, consequently all rollers of the same diameter are delivered into the same chute, the rollers being by this means automatically graded according to their diameters in relation to the distance from their large ends. After the roller has been ejected the supporting block 25 and the roller holder 26 are returned by means of a screw bolt 37 arranged to pass through a tapped hole in a plate 38 secured to one end of the reciprocating member 1, the extremity of the said bolt engaging against the end of the supporting block 25, and moving the latter, together with the roller holder 26, back into its original position, so that the spring blades 29 again engage with the sides of the pin 30 attached to the said supporting member. The position of the bolt 37 may be adjusted by slackening the lock-nut 39. The spring blades 29 hold the supporting block and roller holder stationary until the next roller which is fed on to the locating block is engaged by the edge of the projections on the gage-plate, on the return movement of the reciprocating member.

Owing to the roller holder 26 moving within the channel in the reciprocating member 1, the side of the latter which is opposite the gage-plate 7 takes directly the thrust occasioned by the roller or other article wedging between the gage-plate and its holder. Consequently there are no indirect strains when the gauging takes place, as the roller holder is reinforced by the said side of the channel at a point directly in line with the points of contact between the roller and the said gage-plate and holder.

Should a roller be of a diameter which is too large for any of the grades required it is engaged by the special projection 15 at the one end of the gage-plate 7 (this projection being smaller than or being set rearwards of the projection 14) and is wedged thereby against the roller holder 26. The roller is then carried along with the reciprocating member in a similar manner to the above described, until when the said reciprocating member reaches the end of its stroke, the said roller lies immediately above the chute 40 into which it is ejected, so that it falls into a suitable container 55, the roller in question being discarded. If, on the other hand, a roller is of too small a diameter to be engaged by any of the projections 14, it is arranged to be engaged by the projection 20 upon the separate plate 18, the said projection being larger than, or being set forwardly of, the projection 14 and arranged to engage the roller when the reciprocating member has reached the end of its forward stroke, and is in the position shown in Figure 5. The projection 20 strikes the roller and knocks it from the locating block 21, when it falls down the passage 51 in the reciprocating member into the chute 52, so that it is delivered into the receptacle 53. The rollers which fall into this receptacle are also discarded. If desired the projection 20 may be formed on the gage-plate 7 instead of being upon a separate plate.

The rollers are fed automatically on to the locating block 21. For this purpose a special automatic feed device is employed, the said device being fixed immediately above the locating block 21 and comprising a housing 54 rigidly fixed to a bar 33 carried by the cross-members 56 of the machine frame. This housing 54 is formed with an opening in its top wall communicating with a feed tube 57 and is formed with an opening 58 in its lower wall arranged immediately above the locating block 21, the said openings in the upper and lower walls being out of alignment. Arranged within the said housing 54 is a spring operated sliding block 59 acted upon by a coiled spring 60 arranged at one end of the housing, the said sliding block having a transverse vertical passage 61 which may be put into communication with either of the openings in the walls of the housing 54. The block 59 is provided with a laterally projecting pin 62 at one side passing through a slot 63 in the housing and adapted to be engaged by a vertical arm 64 fixed to the reciprocating member 1 of the gauging apparatus. The spring 60 holds the transverse passage 61 in the sliding block 59 in register with the opening in the top of the housing in communication with the feed tube 57. In this position a roller falls automatically into the said passage 61, which is of a length slightly longer than the roller and is formed with a lead at its upper end. On the reciprocating member 1 returning to its normal position, and just prior to reaching the said position the arm 64 on the said reciprocating member strikes the lateral pin 62 on the sliding block 59 so that the latter is moved longitudinally and the spring 60 compressed, the passage 61, which now contains the roller being placed in communication with the opening 58 in the lower side of the housing 54 immediately above the locating block, the roller automatically dropping on to the latter. The other rollers are successively fed into the roller holder and delivered in a similar manner.

In order automatically to eject the rollers from between the gage-plate 7 and roller holder 26 a special ejector bar is provided. This comprises a bar 65 carried by the bar 55 fixed to the cross-member 56 of the machine, the said bar being set edgewise in a vertical plane and arranged longitudinally so as to extend over the whole of the chutes 35 and the chute 40, and so as to lie immediately above the end of the roller held between the edge of the gage-plate 7 and the roller holder 26 when the reciprocating member 1 has reached the end of its stroke. This ejector bar 65 is attached to the bar 55 by a pair of screw-pins 66, each pin passing through a separate inclined slot 67 in the bar 65, the two slots being parallel to one another, and arranged one near either end of the said bar in the manner shown. Normally the ejector bar 65 is held in a raised position clear of the roller 1 by means of a coiled tension spring 68 so that the screw pins 66 engage with the lower ends of the respective slots 67. Just prior to the reciprocating member 1 reaching the end of its stroke and when the roller is held above its respective chute a vertical pin 69 on the reciprocating member engages against a roller 70 carried by the extremity of a lateral pin 71 upon the end of the ejector bar, and causes the latter to move downwards with a parallel motion so that the pins 66 engage the upper ends of the inclined slots 67, the lower edge of the bar 65 striking against the end of the roller with sufficient force to eject same from between the roller holder 26 and the gage-plate 7 so that it falls into the chute. As soon as the reciprocating member 1 commences its return stroke the ejector bar 65 is again raised by the spring 68.

The lever 5 which imparts a reciprocating motion to the member 1 is hinged at its upper end to a connecting rod 72 pivoted about a trunnion 73 upon the reciprocating member. The lower end of the lever 5 is hinged to turn about a fixed pivot 74, the said lower end of the lever being formed with a longitudinal slot 75 which is engaged by the crank 4. With this arrangement a quick return movement of the reciprocating member may be obtained. A reciprocating motion may be imparted to the member 1 by any other suitable means, if desired.

Figure 1:
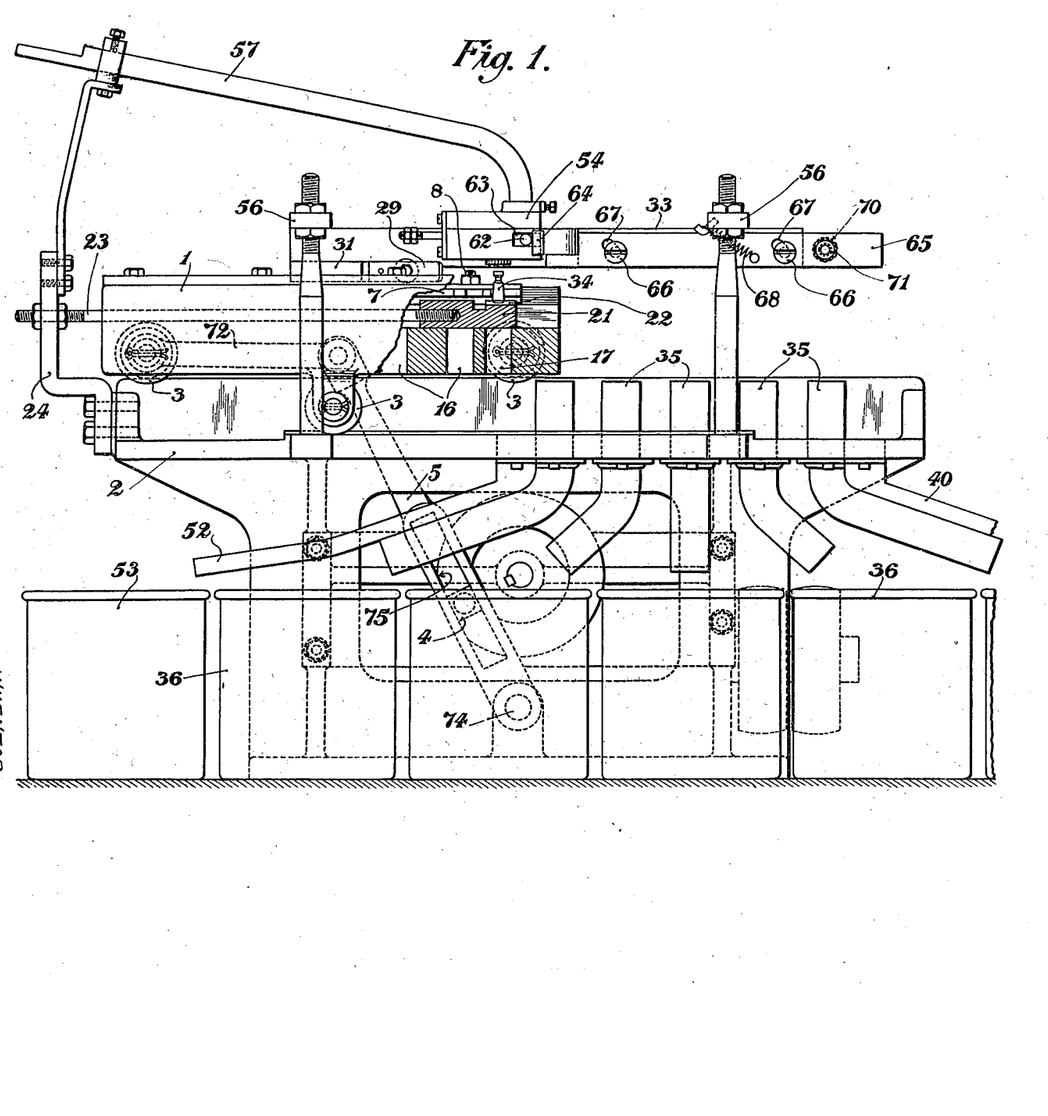
Figure 1 of the accompanying drawings represents a side elevation partly in section, of a grading machine for taper rollers which is constructed in accordance with this invention, and showing the member which carries the roller holder before being moved over the chutes.
Figure 2:
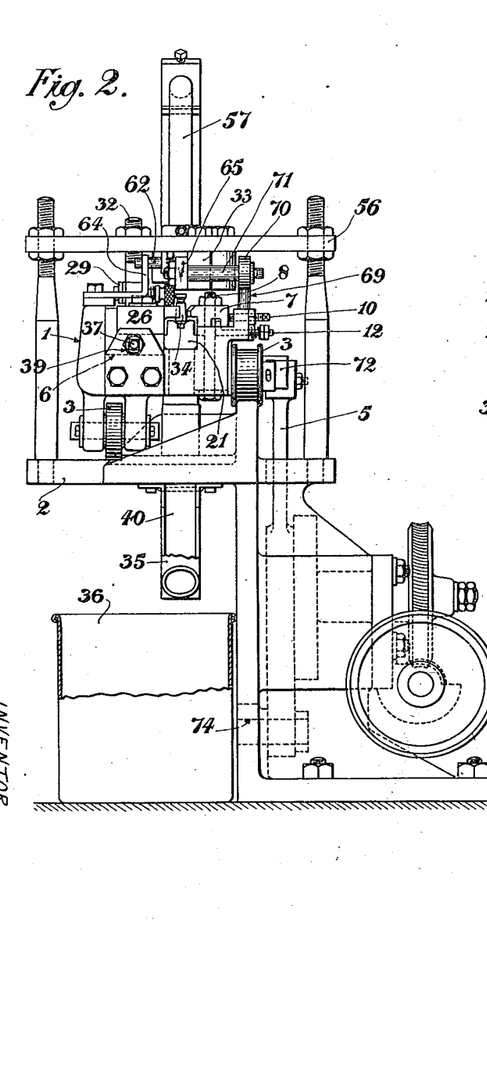
Figure 2 is an end elevation of same.
Figure 3:
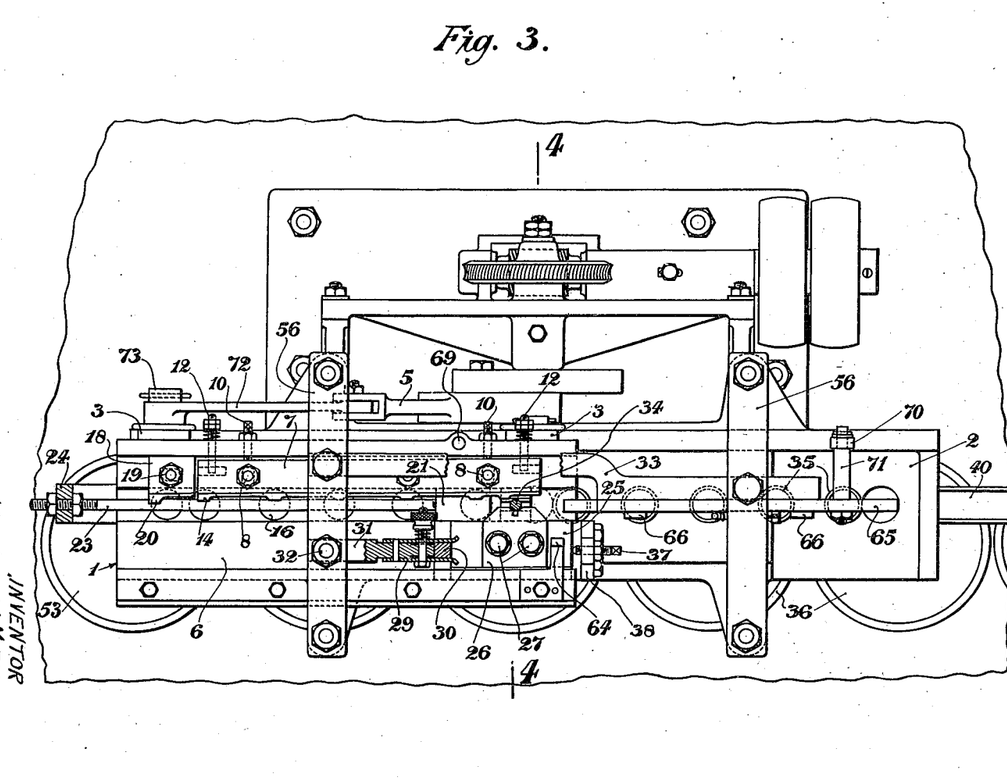
Figure 3 is a top-side plan, partly in section.
Figure 4:
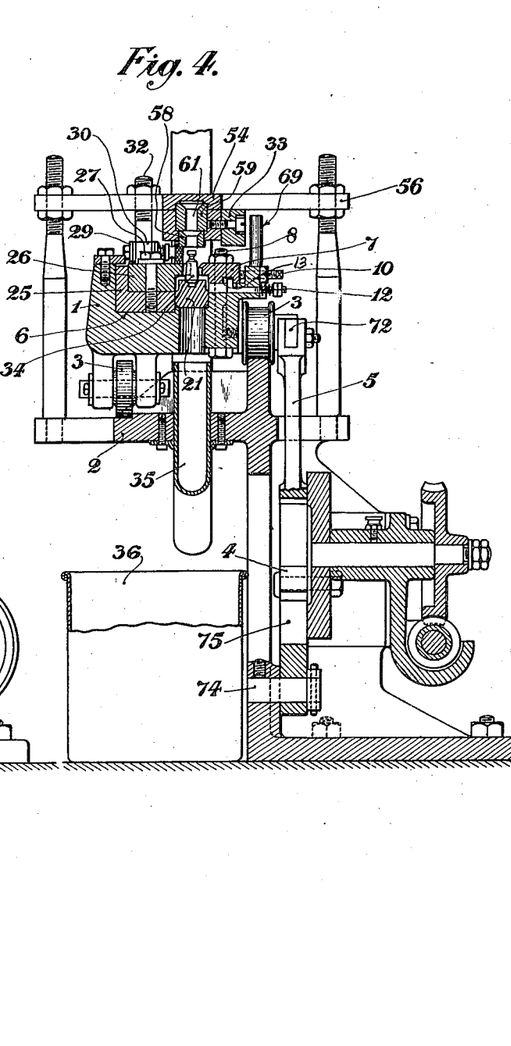
Figure 4 shows a vertical transverse section on the line 4—4 Figure 3.
Figure 5:
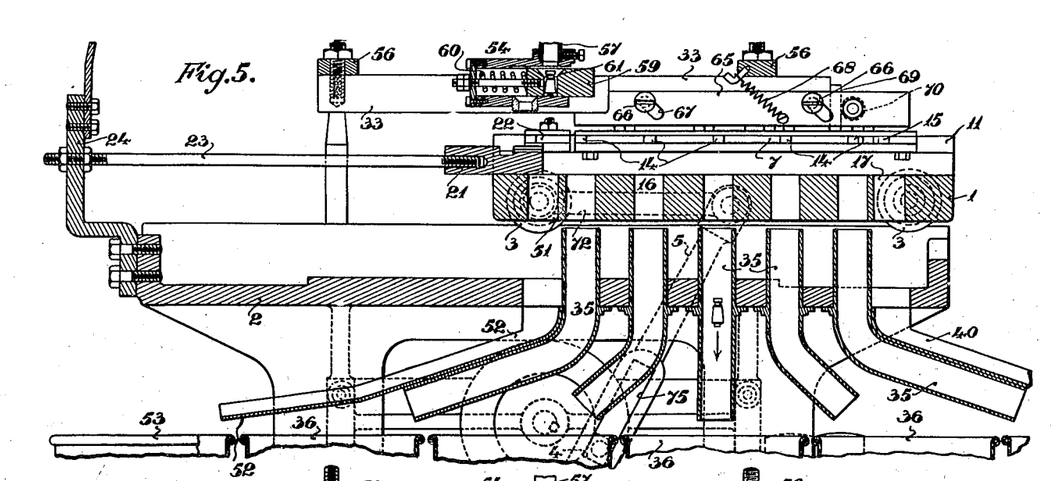
Figure 5 is a vertical longitudinal section through the grading machine, showing the gage-plate and the member carrying the roller holder after they have been moved over the discharge chutes, the roller having just been ejected into the respective chute.
Figure 6:
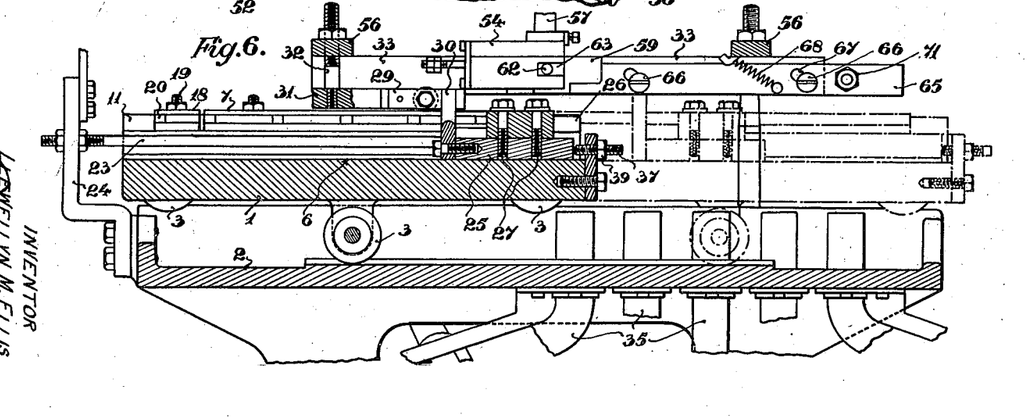
Figure 6 shows a section on the line 6—6 Figure 3.
Figure 7:
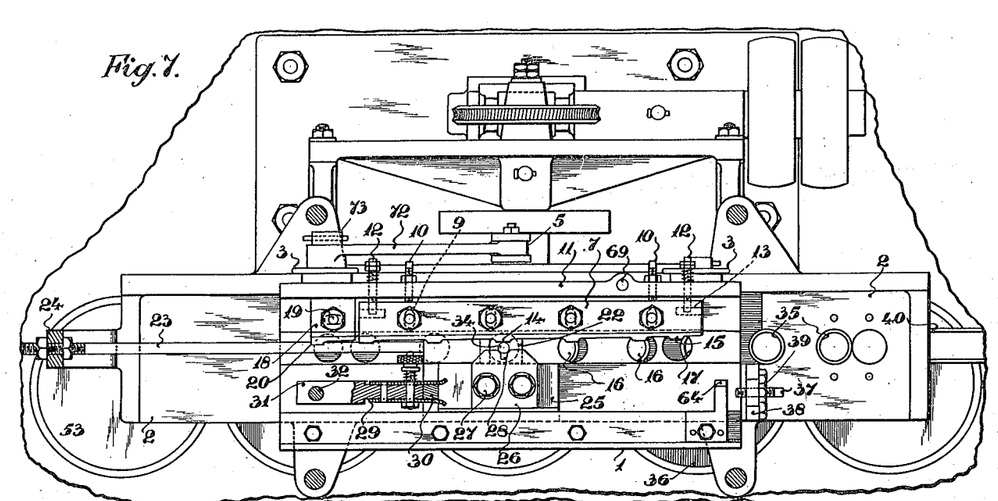
Figure 7 is a horizontal section through the machine, showing the gage-plate at the moment of engaging the roller, but prior to the roller and roller holder being carried along with the reciprocating member.
Figure 8:
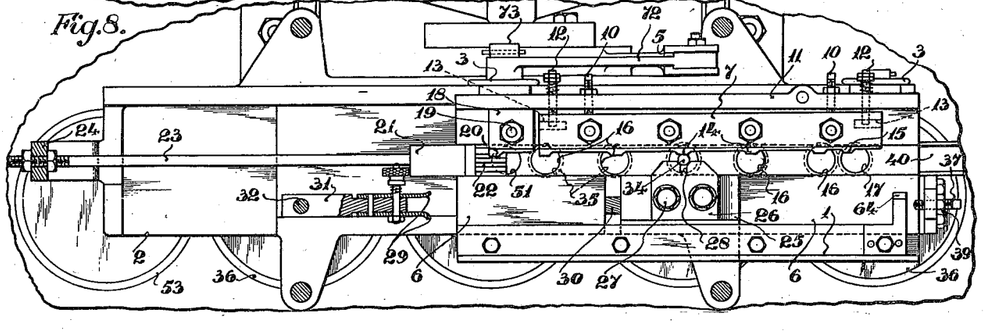
Figure 8 is a similar section, but showing the roller and roller holder carried over the chute into which the roller is to be discharged.
Figure 9:
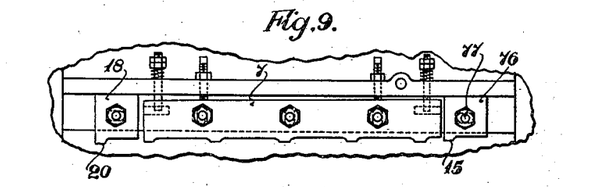
Figure 9 is a plan view of a modified form of gage-plate in which separate ejector plates are provided for rollers which are of too large and of too small a diameter.

Referring to Figure 9 of the drawings, if desired the projection 15, which serves to eject rollers which are of too large a diameter for any of the grades required, may be carried by a separate plate 76 secured to the reciprocating member by a bolt 77, instead of the said projection being formed on the gage-plate 7, as previously described. The projection 20 for ejecting the rollers of too small a diameter is also carried by a separate plate, as in the previous arrangement. The plates 76 and 18 may be adjustable. If desired both the projections 15 and 20 may be formed on the gage-plate 7.

Figure 10:
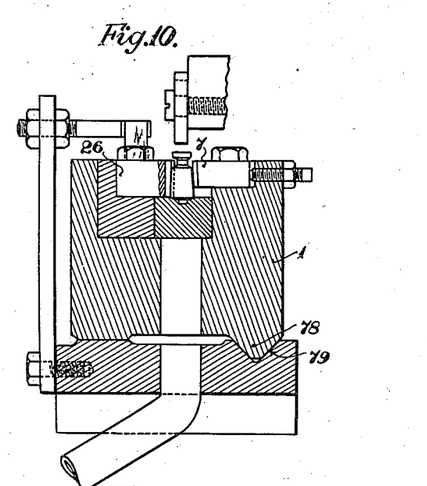
Figure 10 represents a vertical transverse section through a slightly modified form of grading machine.

Referring to the modification shown in Figure 10, instead of the reciprocating member 1 being mounted on rollers it may be provided upon its under face with a longitudinal rib 78 working in a groove or guide 79 in the bed 2 of the machine. Guides of any other suitable form may be employed if desired. In the modification the edge of the V-gap in the roller holder 26 is vertical instead of being undercut, so that the axis of the roller, when held in position is slightly out of the vertical. The edge of the gage-plate 7 is in this arrangement undercut or inclined to a greater extent than in the previous form.

Instead of the roller holder being normally held stationary by a spring, it may be held stationary by a counter weight, or by a magnet or other means.

If desired the locating block may have a plain face instead of being grooved as above described, especially where the apparatus is used for grading articles other than taper rollers.

Figure 11:
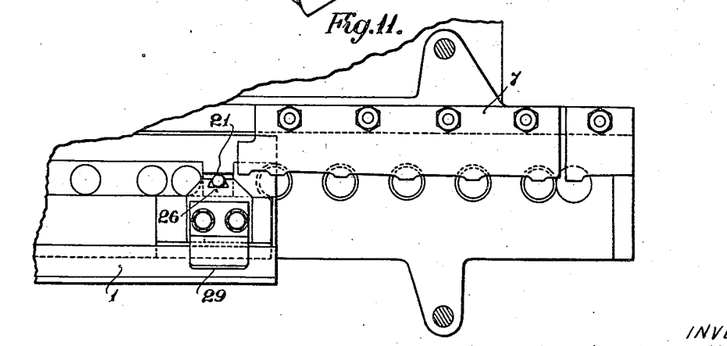
Figure 11 shows a plan view of a further modified form of machine.

Referring to the arrangement shown in Figure 11, if desired the gage-plate 7 may be fixed, being rigidly carried by the framing or bed of the machine, whilst the roller holder 26 may be carried by the reciprocating member 1 until the roller is engaged by one or other of the projections on the gage-plate 7, when the said roller and roller holder are held stationary, the reciprocating member 1 moving on towards the end of the stroke, when the roller is ejected and falls into one of a series of chutes according to its diameter. The roller holder may carry a spring 29 which bears on the reciprocating member 1 and causes the roller holder 26 to move with the latter until the roller engages with the gage-plate 7. Owing to the spring 29 the roller holder 26 tends to move with the reciprocating member 1 throughout its stroke so that the roller remains wedged against the projection on the gage-plate 7 until ejected. The locating block 21 which supports the roller until engaged by the gage-plate, may be carried by, or rigidly fixed to, the reciprocating member 1, as shown.

In any of the above arrangements the gage-plate may have any suitable number of projections, or instead of being provided with projections it may merely have an inclined straight edge.

Having fully described my invention, what I desire to claim and secure by Letters Patent is:—

1. Apparatus for gauging articles comprising a gage-plate, a holder for the article to be gaged, means for imparting a relatively reciprocating movement to the gage-plate and holder so that the said gage-plate and holder move one alongside the other until the article and gage-plate engage with one another, and means for ejecting the article when engaged by the gage-plate.

2. Apparatus for gauging articles comprising a gage-plate, a holder for the article to be gaged, means for imparting a relative reciprocating movement to the gage-plate and holder, a member to which the holder is normally held, means whereby the said member and holder move relatively when the article and gage-plate engage with one another, and means for engaging and positively ejecting the article from between the holder and gage-plate.

3. Apparatus for gauging articles comprising a gage-plate, a holder for the article to be gaged, means for imparting a relative reciprocating movement to the gage-plate and holder, means whereby relative movement between the holder and gage-plate is arrested when the gage-plate and article engage with one another, a member to which the holder is normally held, means whereby the said member and holder move relatively when the article and gage-plate engage with one another, and means for engaging and positively ejecting the article from between the holder and gage-plate.

4. Apparatus for gauging articles comprising a gage-plate, means for imparting a reciprocating movement to the gage plate, a holder for the article to be gaged, means for keeping the holder stationary until the article is engaged by the gage-plate, means for admitting of the gage-plate and holder moving as one unit when the article is engaged by the gage-plate and means for ejecting the article from the holder.

5. Apparatus for gauging articles comprising a holder for the article to be gaged, a gage-plate having its edge inclined with respect to the holder, means for imparting a relatively reciprocating movement to the gage-plate and holder, and means for ejecting the article when engaged with the gage-plate.

6. Apparatus for gauging articles comprising a holder for the article to be gaged, a gage-plate having its edge inclined with respect to the holder, means for imparting a reciprocating movement to the gage-plate, means for keeping the holder stationary until the article is engaged by the gage-plate, means for admitting of the gage-plate and holder moving as one unit when the article is engaged by the gage-plate, and means for ejecting the article from the holder.

7. Apparatus for gauging articles comprising a gage-plate, a reciprocating member carrying the gage-plate, a channel in the reciprocating member, a holder for the article to be gaged guided by the channel in the reciprocating member, means for keeping the holder stationary until the article is engaged by the gage-plate, means for admitting of the gage-plate and holder moving as one unit when the article is engaged by the gage-plate and means for ejecting the article from the holder.

8. Apparatus for gauging articles comprising a gage-plate, a reciprocating member carrying the gage-plate, a channel in the reciprocating member, a holder for the article to be gaged guided by the channel in the reciprocating member, projections on the gage-plate arranged to move past the holder at varying distances therefrom, means for keeping the holder stationary until the article is engaged by one of the projections on the gage-plate, means for allowing the holder to be carried along by the gage-plate when the article is wedged between one of the projections on the gage-plate and the holder, and means for ejecting the article from the holder.

9. Apparatus for gauging articles comprising a gage-plate, a reciprocating member carrying the gage-plate, a channel in the reciprocating member, a holder for the article to be gaged guided by the channel in the reciprocating member, projections at the edge of the gage-plate arranged to move past the holder at varying distances therefrom, means for keeping the holder stationary until the article is engaged by one of the projections on the gage-plate, means for allowing the holder to be carried along by the gage-plate when the article is wedged between one of the projections on the gage-plate, and the holder, and means for ejecting the article from the holder so that it falls through one of a number of openings in the channel of the reciprocating member, immediately below the projections on the gage-plate.

10. Apparatus for gauging articles comprising a gage-plate, a reciprocating member carrying the gage-plate and provided with a channel, a holder for the article to be gaged, a carrier to which the holder is attached arranged to slide in the channel in the reciprocating member, projections at the edge of the gage-plate arranged to move past the holder at varying distances therefrom, a friction device for keeping the holder stationary until the article is engaged by one of the projections on the gage-plate, means for allowing the holder to be carried along by the gage-plate when the article is wedged between one of the projections on the gage-plate and the holder, and means for ejecting the article from the holder when the reciprocating member has moved to the end of its stroke, so that the said article falls into one of a number of openings in the channel of the reciprocating member immediately below the projections on the gage-plate.

11. Apparatus for gauging articles comprising a gage-plate means for imparting a reciprocating movement to the gage-plate, a holder for the article to be gaged, means for keeping the holder stationary until the article is engaged by the gage-plate, means for admitting of the gage-plate and holder moving as one unit when the article is engaged by the gage-plate, a fixed locating block for retaining the article to be gaged within its holder until the said article is engaged by the gage-plate and means for ejecting the article from the holder.

12. Apparatus for gauging articles comprising a gage-plate means for imparting a reciprocating movement to the gage plate, a holder for the article to be gaged, means for keeping the holder stationary until the article is engaged by the gage-plate, means for admitting of the gage-plate and holder moving as one unit when the article is engaged by the gage-plate, and an ejector bar having parallel slots engaging pins on a fixed support, the said bar being adapted to be engaged by a part on the reciprocating member, so that it is thereby caused to strike and eject the roller from its holder.

13. Apparatus for gauging articles comprising a gage-plate, means for imparting a reciprocating movement to the gage plate, a holder for the article to be gaged, means for keeping the holder stationary until the article is engaged by the gage-plate, means for admitting of the gage-plate and holder moving as one unit when the article is engaged by the gage-plate, an automatic feed consisting of a sliding member operated by the reciprocating member and having a passage which may be brought into communication with feed-openings in a housing so as to allow the article to automatically engage with the roller holder, and means for ejecting the article from the holder.

14. Apparatus for gauging articles comprising a gage-plate, means for imparting a reciprocating movement to the gage plate, a holder for the article to be gaged, means for keeping the holder stationary until the article is engaged by the gage-plate, means for admitting of the gage-plate and holder moving as one unit when the article is engaged by the gage-plate, means for ejecting the article from the holder, and means for returning the holder back into its normal position.

In testimony whereof I have hereunto set my hand.

LLEWELLYN MILFORD ELLIS.

Witnesses:
  HENRY NORTON SKERRETT,
  WILLIAM STARKES SKERRETT.